June 15, 1948.  F. VANCURA  2,443,364
GEOMETRICAL INSTRUMENT
Filed April 20, 1944  2 Sheets-Sheet 1
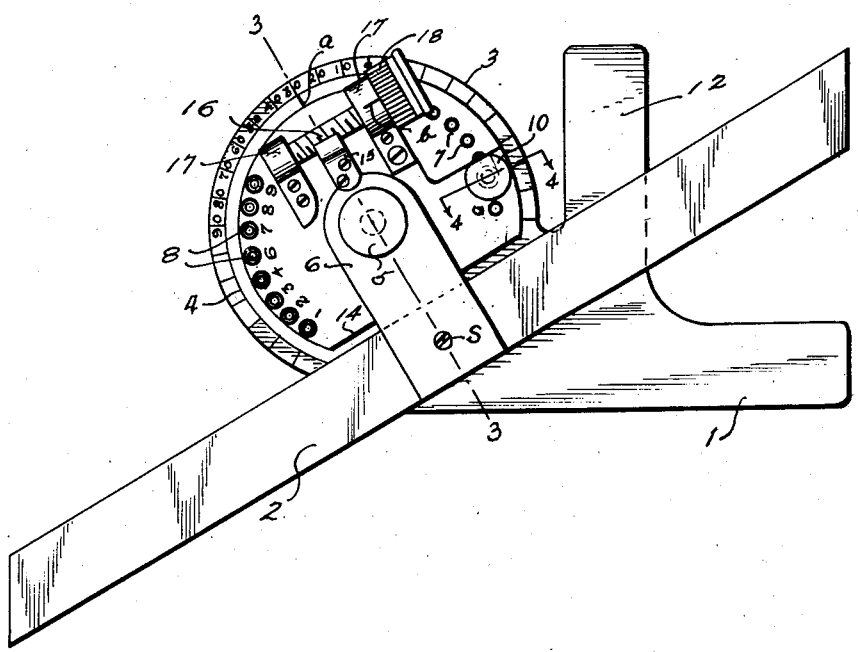
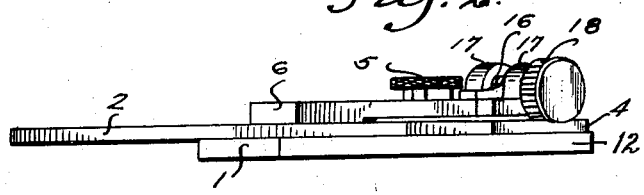
Inventor
FRANK VANCURA,
By Clarence A. O'Brien
and Harvey B. Jacobson
Attorneys June 15, 1948. F. VANCURA 2,443,364
GEOMETRICAL INSTRUMENT
Filed April 20, 1944 2 Sheets-Sheet 2

Inventor
FRANK VANCURA,
By *Clarence A. O'Brien
and Harvey B. Jacobson*
Attorneys Patented June 15, 1948

2,443,364

UNITED STATES PATENT OFFICE 2,443,364

GEOMETRICAL INSTRUMENT

Frank Vancura, Santa Ana, Calif.

Application April 20, 1944, Serial No. 531,941

2 Claims. (Cl. 33—75)

This invention relates generally to precision instruments, and has more particular reference to improvements in the type of instrument disclosed in my U. S. Letters Patent No. 2,124,358, dated July 19, 1938.

The primary object of the present invention is to provide improved and simplified means for securing micrometer adjustment of the upper straight edge-carrying plate relative to the upper disc of the instrument.

Another important object of the present invention is to provide simple and efficient means for readily securing accurate vernier adjustment of the upper disc relative to the lower disc of the instrument.

Another object of the invention is to generally simplify and improve this type of instrument so as to provide a compact arrangement of parts in which the upper straight edge is effectively braced in all of its positions of adjustment relative to the lower straight edge.

Still another object of the present invention is to simplify the upper straight edge-carrying plate and the micrometric adjusting means therefor.

The exact nature of the present invention, as well as the advantages thereof, will become apparent from the following description when considered in connection with the accompanying drawings, in which:

Figure 1 is a top plan view of a precision instrument constructed in accordance with the present invention.

Figure 2 is an edge elevational view thereof looking toward the left of Figure 1.

Figure 5:
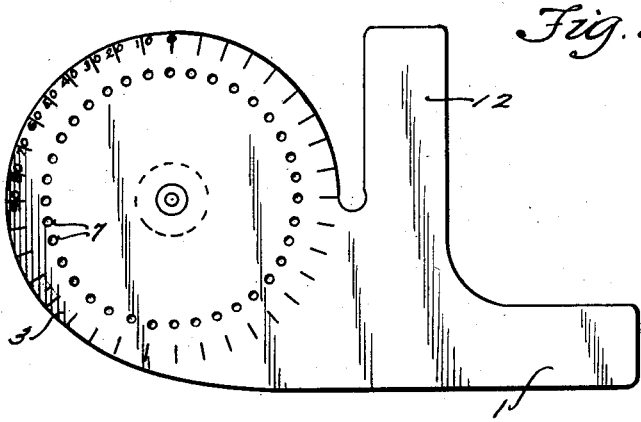
Figure 5 is a plan view of the lower disc and its straight edge.

Referring in detail to the drawings, the present instrument includes straight edges 1 and 2, lower and upper discs 3 and 4, respectively, and an upper plate 6, the straight edge 1 being carried by the disc 3 and extending tangentially therefrom, and the straight edge 2 being secured at s intermediate its ends to the under side of the outer end of plate 6. The two discs are concentrically pivoted for relative rotation, and a clamping screw 5 is provided for securing the two discs in any position of angular displacement to which they may be brought. The underlying disc 3 is larger than the overlying disc 4 by sufficient margin, and the margin of the underlying disc is graduated as shown to form a scale. The overlying disc 4 is bevel edged and bears at its edge a radially extending index line a. The structure and the graduation of the margin of disc 3 and the positioning of the index line a are such and so correlated that the index line upon disc 4 by its position along the circumferentially extending scale upon the margin of disc 3 affords measure of the angularity at which the two straight edges 1 and 2 stand related. In the position shown in Figure 1, for example, the reading 30 tells that the straight edges are inclined to one another at an angle of 30°.

Figure 4:
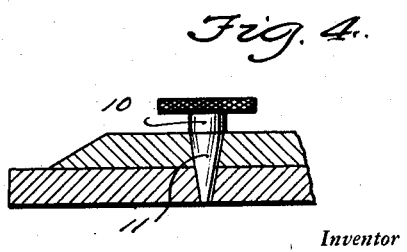
Figure 4 is an enlarged fragmentary section taken on the plane of line 4—4 of Figure 1.

As usual, the margin of the disc 3 is graduated in degrees, only 5 and 10 degree graduations being shown for sake of clearness. In order to measure with greater precision, the infinitely variable angle at which the straight edges may stand, a vernier adjustment is employed, in consequence of which the angularity of the straight edges may be readily measured in single degrees. For this purpose, the disc 3 is provided with a circular series of marginal apertures 7 inwardly of the scale of disc 3. There are 36 of the apertures 7 and they are equally spaced, one being coincident with each 10-degree graduation of the scale on disc 3. In addition, the disc 4 is provided at one side with 8 marginal openings, as at 8. The openings 8 that are numbered 1 to 4, inclusive, and 6 to 9, inclusive, are 9° apart, while the openings 8 that are numbered 4 and 6 are 8° apart. These openings in the disc 4, as at 8, are preferably numbered 1 to 4, inclusive, and 6 to 9, inclusive, as shown. Two other openings are provided at 9 in the margin of the disc 4 at the other side of the latter, and they are 15° apart. The openings at 9 are respectively numbered 0 and 5, as shown. The apertures 8 and 9 in the disc 4 are arranged so that they will selectively register with the openings 7 in the disc 3, and a removable pin 10 is provided that may be simultaneously entered in aligned openings 7 and 8 of the discs 3 and 4 to hold said discs in their relatively adjusted position. Preferably, the openings 7 and 8 are tapered to receive the tapered shank 11 of the pin 10 in a snug manner, as shown in Figure 4. The arrangement is such that when a particular adjustment of straight edge 2 relative to straight edge 1 is desired, the disc 4 may be turned relative to disc 3 to the approximate position, whereupon the disc 4 may be accurately adjusted relative to disc 3 to effect the exact desired adjustment of the straight edges relative to each other when certain of the holes 7 and 8 are aligned and will receive the shank of pin 10. For instance, if a 31-degree adjustment is desired, disc 4 is turned until its index line is slightly past the 30-degree graduation of the scale on disc 3. The pin 10 is then plugged into the hole marked "1" on disc 4, and in order to cause the plug to also enter the proper opening 7 of disc 3, said plug will cause accurate adjustment of disc 4 relative to disc 3 so that the index line $a$ will be exactly located at the 31-degree point of the scale on disc 3. Thus, no minute graduation in single degrees is needed on the scale of disc 3, 5 and 10-degree graduations being sufficient. For a 32-degree adjustment, the pin will be plugged in the hole marked "2"; for a 33-degree adjustment, in hole marked "3," and so on. The same effect is had for single degree adjustment between any of the main graduations in 10-degree distances of the scale on disc 3. Thus, a simple and efficient vernier adjustment of disc 4 relative to disc 3 is had which renders it unnecessary to provide minute single degree graduations on the scale of disc 3 that are difficult to read and accurately use. The essence of this adjustment is that there are 36 openings at 7 in the disc 3 and 10 in the disc 4, the two adjacent openings 9 of disc 4 being 15° apart and the others at 8 being specially spaced apart. As the openings 7 are 10° apart, it is evident that accurate single degree adjustment of one disc relative to the other is afforded by plugging the pin 10 in the apertures of the two discs that may be registered.

As previously pointed out, the straight edge 2 is secured to the under side of plate 6, and it will thus be disposed to bear directly upon the straight edge 1 rather than being spaced therefrom. Also, the straight edge 1 has a right angular extension 12 near its point of connection with the disc 3 and projecting along one side of the latter in position to underlie the adjacent end portion of straight edge 2 when the latter is adjusted at any material angle relative to the straight edge 1. In this way, a compact structure is had in which the straight edge 2 is effectively braced in all of its ordinary positions of adjustment relative to the straight edge 1.

Figure 3:
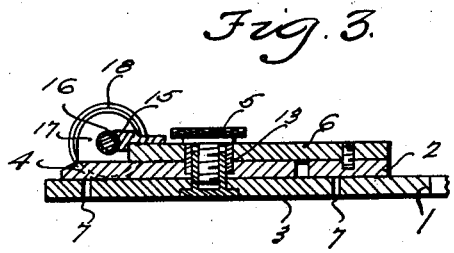
Figure 3 is a section taken substantially on the plane of line 3—3 of Figure 1.
Figure 6:
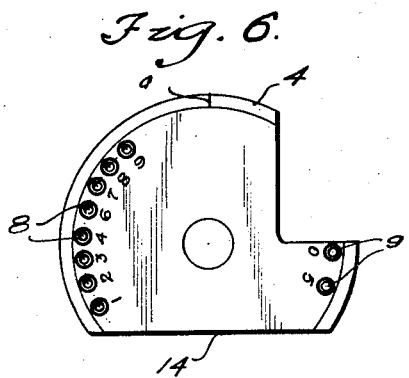
Figure 6 is a plan view of the upper disc.

As clearly shown in Figures 1 and 3, the plate 6 is disposed upon the upper disc 4 and has one end pivoted on a bushing 13 coincident with the axes of the discs 3 and 4 and surrounding the clamping screw 5. At one side, disc 4 is cut away and provided with a straight edge portion 14 which is normally parallel with and spaced from the adjacent longitudinal or inner edge of the straight edge 2. Thus, the straight edge 2 is allowed to have the position beneath the plate 6 in contact with the straight edge 1 and is capable of angular adjustment to a limited extent relative to the upper disc 4. Micrometric means is provided for effecting the last-mentioned adjustment, which means includes a lug 15 fixed to and projecting radially from the inner end of plate 6 and formed in its outer end with threads engaging the fine threads of a micrometric adjusting screw 16. The adjusting screw 16 is journaled in bearings 17 on upper disc 4, and is provided at one end with a graduated adjusting thimble 18 that cooperates with an index line $b$ on the adjacent bearing 17. The thimble 18 is graduated in minutes so that one complete turn thereof, and consequently one complete turn of the screw 16, constitutes one degree of adjustment of the plate 6 and the straight edge 2 relative to the disc 4. This provides a simplified and efficient means of effecting a micrometric adjustment of the straight edge 2 relative to the straight edge 1 after securing the rough and vernier adjustments of disc 4 relative to disc 3, as previously pointed out. It will thus be seen that the straight edge 2 may be readily and expeditiously adjusted in an accurate manner relative to the straight edge 1 so that the angle of straight edge 2 relative to straight edge 1 may be any desired number of degrees and minutes. At the same time, the only fine reading required is that upon the comparatively large thimble 18 of the micrometric adjusting screw 16, the relation of the graduations of said thimble 18 relative to the index line $b$ being conveniently noticeable. Of course, the threaded end of lug 15 will have to be of slight arcuate form in order to remain in mesh with the screw 16 in the various positions of adjustment of plate 6 relative to disc 4. This adjustment is slight, being only one degree to either side of a line coincident with the longitudinal axis of plate 6. In explaining the use of the instrument, it may be supposed that the angle is to be measured at which two lines lie upon a drawing. Screw 5 is initially tight with the line $a$ coincident with the zero graduation of the scale on disc 3 and with the zero graduation of thimble 18 coincident with the index line $b$. Straight edge 1 is laid on the drawing in coincidence with one of the lines, and disc 4, after loosening the screw 5, is turned until straight edge 2 comes to coincidence with the other line of the drawing. Screw 5 is then tightened. Conceivably line $a$ of disc 4 may then be found to be coincident with a graduation line in the scale upon the margin of disc 3, and in such case no further mensuration is needed. The angle is of so many degrees value. If, however, as ordinarily will be the case, the line $a$ is found in intermediate position between two graduations of the scale, screw 5 is made tight and screw 16 is turned until the line $b$ comes to coincidence with the required graduation on thimble 18. The reading of the scales will then give the minutes by which the angle under mensuration exceeds the number of degrees now indicated by line $a$ with respect to the scale upon disc 3. Obviously, by oppositely turning the screw 16 (assuming the initial setting to be such as to permit opposite turning), the interval may be measured in minutes by which the line $a$ in its position falls short of the next higher degree mark.

Many advantageous uses of the present instrument will be apparent to those skilled in the art, and the advantages of the invention will be at once appreciated. Minor changes in details of construction are contemplated such as fairly fall within the spirit and scope of the invention as claimed.

What I claim is:

1. A precision instrument of the character described, comprising two straight edge members, two discs coaxially mounted and relatively rotatable, a plate mounted for rotation on the common axis of the two discs and carrying one of the straight edge members, micrometric adjusting means for securing the plate for integral rotation with or micrometrically adjusting it with respect to the immediately adjacent disc, the more remote disc carrying the other straight edge member, and means to facilitate and secure a vernier adjustment of one disc relative to the other, the one straight edge member being fixed to the under side of the plate and bearing upon the other straight edge member, said adjacent disc having a straight edge coacting with the inner edge of said one straight edge member to limit the micrometric adjustment of the plate.

2. A precision instrument of the character described, comprising two straight edge members, two discs coaxially mounted and relatively rotatable, a plate mounted for rotation on the common axis of the two discs and carrying one of the straight edge members, micrometric adjusting means for securing the plate for integral rotation with or micrometrically adjusting it with respect to the immediately adjacent disc, the more remote disc carrying the other straight edge, and means to facilitate and secure a vernier adjustment of one disc relative to the other, said micrometric adjusting means including a lug fixed to the plate and having a threaded end edge, and a micrometric screw extending crosswise of and meshing with the threaded end edge of said lug, said screw having its ends journaled upon said immediately adjacent disc at opposite sides of said lug.

FRANK VANCURA.

REFERENCES CITED

The following references are of record in the file of this patent:

UNITED STATES PATENTS

| Number    | Name     | Date          |
|-----------|----------|---------------|
| 1,123,294 | Hewitt   | Jan. 5, 1915  |
| 1,147,105 | Lederer  | July 20, 1915 |
| 1,329,005 | Neumaier | Jan. 27, 1920 |
| 1,358,604 | Zhukoff  | Nov. 9, 1920  |
| 1,864,341 | Davie    | June 21, 1932 |